United States Patent [19]

Chamberlain et al.

[11] 4,146,248

[45] Mar. 27, 1979

[54] VEHICLE AXLE MOUNT

[75] Inventors: Richard W. Chamberlain, Aurora; Harvey A. Knell, Yorkville, both of Ill.

[73] Assignee: Caterpillar Tractor Co., Peoria, Ill.

[21] Appl. No.: 834,743

[22] Filed: Sep. 19, 1977

[51] Int. Cl.² .............................................. B62D 53/00
[52] U.S. Cl. ....................................... 280/688; 180/73
[58] Field of Search ...................... 280/106.5, 724, 688; 180/71, 73, 75

[56] References Cited

U.S. PATENT DOCUMENTS 2,954,835   10/1960   Janeway ................................ 280/724

*Primary Examiner*—Philip Goodman
*Attorney, Agent, or Firm*—Charles E. Lanchantin, Jr.

[57] ABSTRACT

A vehicle axle mount includes an axle assembly with first and second pairs of aligned connection joints, a vehicle frame having first and second pairs of aligned connection joints with the first pairs of joints of the frame and axle assembly being coupled together, and a pair of connecting links coupled between the second pairs of joints of the frame and the axle assembly.

9 Claims, 3 Drawing Figures

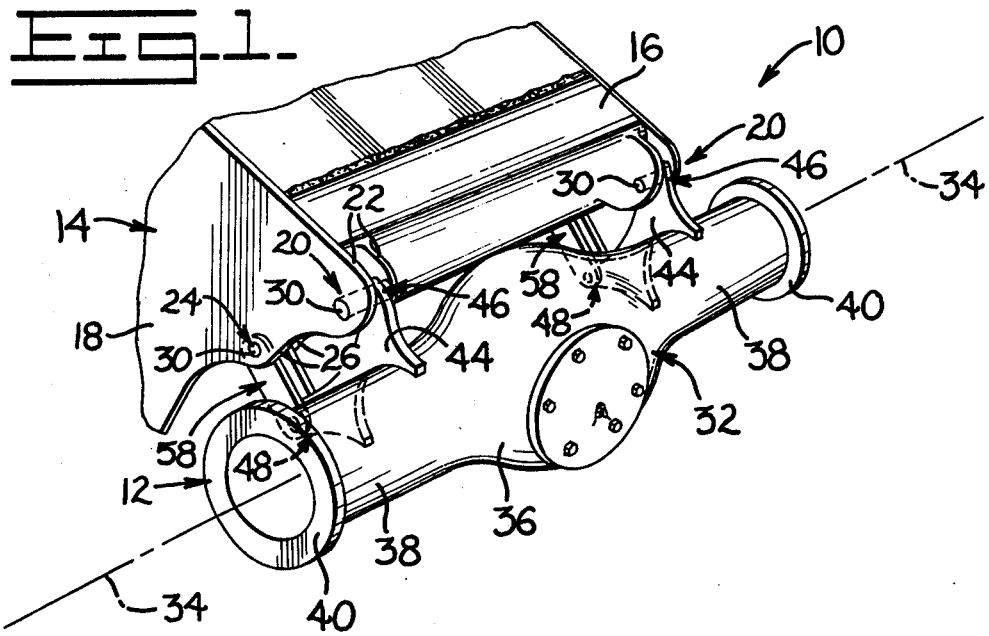
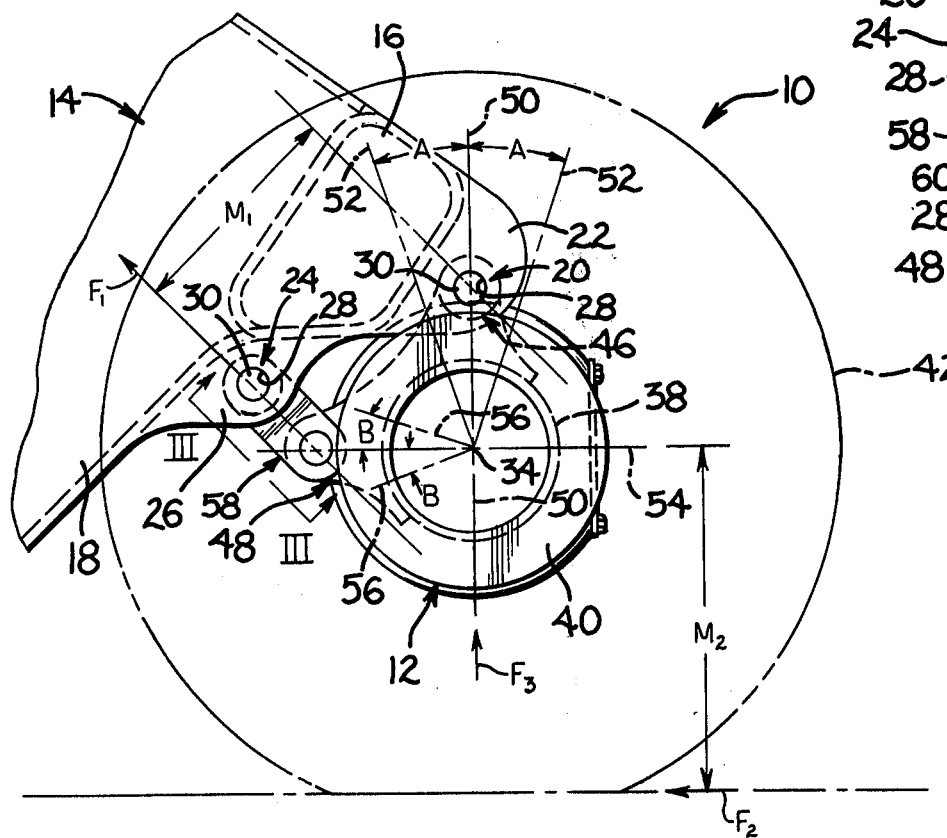
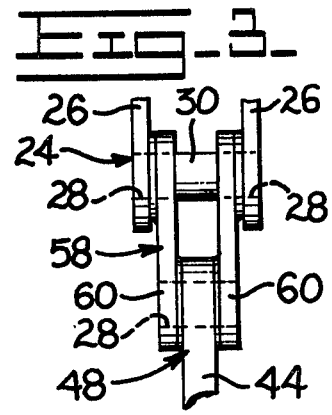

VEHICLE AXLE MOUNT

BACKGROUND OF THE INVENTION

This invention is related to a means for securing an axle assembly reliably to a vehicle frame, and more particularly to a mount that simplifies the installation of the axle assembly to the frame, reduces machining costs, gives excellent structural life and requires minimal vertical and/or horizontal adjustment of the components during assembly.

In the past, axle assemblies have been secured to a vehicle frame by vertically oriented groups of bolts disposed forwardly and rearwardly of the axis of the axle housing which join facing pads on the housing and frame. Because of the large loads and high shear stresses carried by these bolts, it has been heretofore necessary to employ a great number of relatively large diameter and expensive bolts and to machine flat surfaces on large and rigid mounting surfaces. This complicates servicing of these components.

Another problem is that when the axle assembly is large, for example in the order of 24,000 pounds, it is difficult to move it into place.

Specifically, it is a difficult process to move the axle assembly horizontally and longitudinally inwardly under various depending ledges or pads on the frame and thereafter to elevate the axle assembly a considerable distance. Even when the axle assembly pads and frame pads are juxtaposed it is a vexatious procedure to align the various elements sufficiently for bolts or mounting pins to be inserted into place.

SUMMARY OF THE INVENTION

The present invention is directed to overcoming one or more of the problems as set forth above.

According to the present invention, a vehicle axle mount includes an axle assembly with first and second pairs of aligned connection joints, a vehicle frame having first and second pairs of aligned connection joints with the first pairs of joints of the frame and axle assembly being coupled together, and a pair of connecting links coupled between the second pairs of joints of the frame and the axle assembly.

BRIEF DESCRIPTION OF THE DRAWINGS

FIG. 1 is a fragmentary, diagrammatic, and perspective view of the vehicle axle mount of the present invention.

FIG. 2 is a fragmentary, diagrammatic, side elevational view of the axle mount shown in FIG. 1 with the wheels and ground line shown in broken lines.

FIG. 3 is a fragmentary, diagrammatic view as taken along line III—III of FIG. 2.

DETAILED DESCRIPTION

A vehicle axle mount 10 is shown in FIGS. 1 and 2 wherein an axle assembly 12 is connected to a vehicle frame 14 in accordance with the present invention.

The vehicle frame 14 has a first or upper body portion 16 and a second or lower body portion 18, with the upper body portion extending longitudinally and horizontally outwardly above the lower body portion. On the first body portion are a first pair of transversely aligned connecting joints 20, with each of these joints having an upright pair of parallel and outwardly extending juxtaposed plates or upper ears 22. Likewise, on the second body portion there are a second pair of transversely aligned connecting joints 24 individually disposed below and longitudinally inwardly of the joints 22, with each of the joints 24 having an upright pair of parallel and outwardly extending plates or lower ears 26. Each of the upper and lower ears has a cylindrical opening 28 therethrough so that each cooperating pair of ears receives a transversely oriented and horizontally disposed retaining pin 30.

The axle assembly 12 has a hollow axle housing 32 arranged along a transversely disposed central axis 34 with a central, spherical-like body portion 36 and a generally cylindrical arm 38 extending transversely outwardly from each side thereof. A flange 40 is formed on the outer end of each of these arms for mounting a conventional rubber tired wheel 42.

An upright mounting bracket or plate 44 is secured to each of the arms 38 of the axle housing 32 in longitudinally aligned relation with the respective connecting joints 20 and 24 on the vehicle frame 14. Each bracket has a first or upper pin connecting joint 46 thereon and a second or lower pin connecting joint 48 thereon. The upper joints include pin-receiving openings 28, similar to the cylindrical openings 28 in the frame ears 22, which are preferably disposed substantially directly vertically above the axis 34 or on a vertical plane 50 therethrough. However, it is to be appreciated that such openings could be disposed in an inclined plane 52 passing through the central axis of the axle assembly and deviating from the vertical plane by a preselected angle A as is illustrated in FIG. 2. Preferably, the preselected angle A is limited to a relatively small acute angle in order to minimize bending in the joint.

The second or lower pair of pin connecting joints 48 on the axle brackets 44 also have similar pin-securing openings 28 which are disposed substantially directly rearwardly or inwardly of the central axis 34. Particularly, such lower connecting joints are disposed substantially on a horizontal plane 54 passing through the central axis. Moreover, here again, the openings on these lower joints could be disposed in an inclined plane 56 passing through the central axis without departing from the spirit of the present invention, and deviating from the horizontal plane by a preselected angle B as is shown in FIG. 2. Preferably, the preselected angle B is limited to a relatively small acute angle in order to better enable working forces on the axle assembly 12 to be so directed as to cause minimum bending in the frame 14 and the axle brackets 44.

Pursuant to the present invention, provision is made to couple the lower pair of connecting joints 24 on the frame 14 with the lower pair of connecting joints 48 on the axle assembly 12 with a pair of connecting links 58. As best shown in FIG. 3, each of the connecting links has two parallel members 60 with cylindrical openings 28 formed therethrough at the opposite ends thereof for receiving the retaining pins 30. The members 60 are preferably separate for reasons of manufacturing economy.

In operation, the vehicle frame 14 is placed on blocks or is otherwise elevated so that the axle assembly 12 may be moved horizontally inwardly for installation thereon. In accordance with the present invention, it is a relatively simple and convenient matter to initially transversely align the upper joints 20 and 46 of the vehicle frame and axle assembly respectively so that the two retaining pins 30 may be installed interlockingly between them.

With the connecting links 58 previously coupled to the vehicle frame 14 at the lower pair of connecting joints 24 by two retaining pins 30, the axle assembly is rocked or pivoted slightly about the coupled upper joints 20 and 46. Simultaneously, the links may be rocked from their vertically hanging positions in a forward direction to cause the lower openings 28 in the links to transversely align with the corresponding openings of the lower connecting joints 48 of the axle assembly. Two retaining pins 30 are then installed quickly and effectively in place to complete the assembly.

In accordance with these teachings, it can now be recognized that the lower connecting joints 24 on the frame 14 are preferably disposed in the upper, inward quadrant or upper left quadrant when viewing FIG. 2, to better distribute operating forces between the links 58 and the frame. Also, it is preferable that the joints 20 and 24 on the frame be disposed above the horizontal plane 54 passing through the axis 34. Particularly, as best visualized by reference to FIG. 2, the joints 20, 24, 46 and 48 are preferably so located as to give minimum bending moments and pivot reactions due to any combination of rim pull force $F_2$ times its moment arm $M_2$ and vertically oriented wheel reaction $F_3$ times any moment arm away from the joint 20. Note that the reacting link force $F_1$ acts through a moment arm $M_1$ to resist such combination forces, and preferably therefor the links 58 are inclined or oriented at an angle of approximately 45° from a horizontal plane.

In view of the foregoing, it is readily apparent that the vehicle axle mount 10 of the present invention provides an improved construction requireing but minimal vertical manipulation of either the axle assembly 12 or the vehicle frame 14 to effect a quick coupling therebetween by the links 58. Moreover, only six retaining pins 30 are required to assemble the elements. This contrasts sharply to prior straddle mount constructions requiring as much as a foot of vertical movement of the elements and precise manipulation thereof in order to align a substantial number of bolt holes.

The embodiments of the invention in which an exclusive property or privilege is claimed are defined as follows:

1. A vehicle axle mount (10) comprising:
   an axle assembly (12) having a transversely disposed central axis (34), a first pair of transversely aligned connection joints (46), and a second pair of transversely aligned connection joints (48);
   a vehicle frame (14) having a first pair of transversely aligned connection joints (20) and a second pair of transversely aligned connection joints (24), said first pairs of joints (20,46) of the frame (14) and the axle assembly (12) being individually coupled directly together; and
   a pair of connecting links (58), each link (58) being coupled between a respective one of said second pair of joints (24,48) of the frame (14) and the axle assembly (12).

2. The vehicle axle mount (10) of claim 1 wherein each of said joints (20,24,46,48) is coupled together by a transversely oriented and horizontally disposed retaining pin (30).

3. The vehicle axle mount (10) of claim 2 wherein said first pair of joints (46) of the axle assembly (12) is disposed substantially vertically above said axis (34).

4. The vehicle axle mount (10) of claim 3 wherein said second pair of joints (48) of the axle assembly (12) is disposed substantially on a horizontal plane (54) passing through said axis (34).

5. The vehicle axle mount (10) of claim 1 wherein said vehicle frame (14) has a first body portion (16) and a second body portion (18), said first body portion (16) extending outwardly above said second body portion (18), said first pair of joints (20) of the frame (14) being disposed on said first body portion (16) and said second pair of joints (24) of the frame (14) being disposed on said second body portion (18).

6. The vehicle axle mount (10) of claim 5 wherein said first pair of joints (20) of the frame (14) and said second pair of joints (24) of the frame (14) are disposed above a horizontal plane (54) passing through said central axis (34).

7. The vehicle axle mount (10) of claim 6 wherein said first pair of joints (46) of the axle assembly (12) is disposed substantially on a vertical plane (50) passing through said central axis (34).

8. The vehicle axle mount (10) of claim 7 wherein each of said first and second pairs of joints (20,24) of the vehicle frame (14) includes a pair of parallel and outwardly extending plates (22), each plate (22) having a pin-receiving opening (28) therethrough.

9. The vehicle axle mount (10) of claim 8 wherein each of said first and second joints (46,48) of the axle assembly (12) includes a plate (44) extending radially outwardly from said central axis (34) in an upright orientation.

* * * * *